US012036479B2

(12) United States Patent
Park et al.

(10) Patent No.: US 12,036,479 B2
(45) Date of Patent: Jul. 16, 2024

(54) COLLECTION BUNDLE PURCHASE DEVICE AND COLLECTION BUNDLE PURCHASE METHOD

(71) Applicant: NCSOFT Corporation, Seoul (KR)

(72) Inventors: Jongmin Park, Seongnam-si (KR); Songhee So, Seongnam-si (KR); Joowon Lee, Seongnam-si (KR); Yeongyeong Joo, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 17/693,955

(22) Filed: Mar. 14, 2022

(65) Prior Publication Data
US 2022/0226739 A1 Jul. 21, 2022

(30) Foreign Application Priority Data
Jan. 18, 2021 (KR) .................. 10-2021-0006827

(51) Int. Cl.
*A63F 13/85* (2014.01)
*A63F 13/792* (2014.01)
*A63F 13/822* (2014.01)

(52) U.S. Cl.
CPC ............ *A63F 13/85* (2014.09); *A63F 13/792* (2014.09); *A63F 13/822* (2014.09); *A63F 2300/575* (2013.01)

(58) Field of Classification Search
CPC . G06Q 30/0631; A63F 13/792; A63F 13/822; A63F 13/85
See application file for complete search history.

(56) References Cited

U.S. PATENT DOCUMENTS

2015/0186976 A1* 7/2015 Ohkubo ................. A63F 13/69
705/26.7

FOREIGN PATENT DOCUMENTS

JP 2015-127862 A 7/2015
KR 10-1981643 B1 5/2019

OTHER PUBLICATIONS

PHPPot. "Shopping Cart Item Quantity Increment Decrement with AJAX." Feb. 7, 2018. https://web.archive.org/web/20200424233216/https://phppot.com/php/shopping-cart-item-quantity-increment-decrement-with-ajax/ (Year: 2020).*
Communication dated Aug. 17, 2022 from the Korean Intellectual Property Office in Application No. 10-2021-006827.
Lineage M, "Specification up by extinguishing active equipment? Controversy over inducing excessive billing", retrieved from the internet: <http://www.newsworker.co.kr/news/articleView.html?idxno=15434>, 2018, 10 pages total.
Lineage M, "2 How to Supply and Demand Diamonds with No Charge—Item enhancement", internet posted writing: https://dailyfun.kr/63, 2018, 13 pages total.

* cited by examiner

*Primary Examiner* — Reginald A Renwick
(74) *Attorney, Agent, or Firm* — Sughrue Mion, PLLC

(57) ABSTRACT

A collection bundle purchase device includes: at least one processor, wherein the at least one processor displays a collection included in a collection menu based on a user input, and purchases the collection as a bundle based on the user input for the collection.

9 Claims, 5 Drawing Sheets

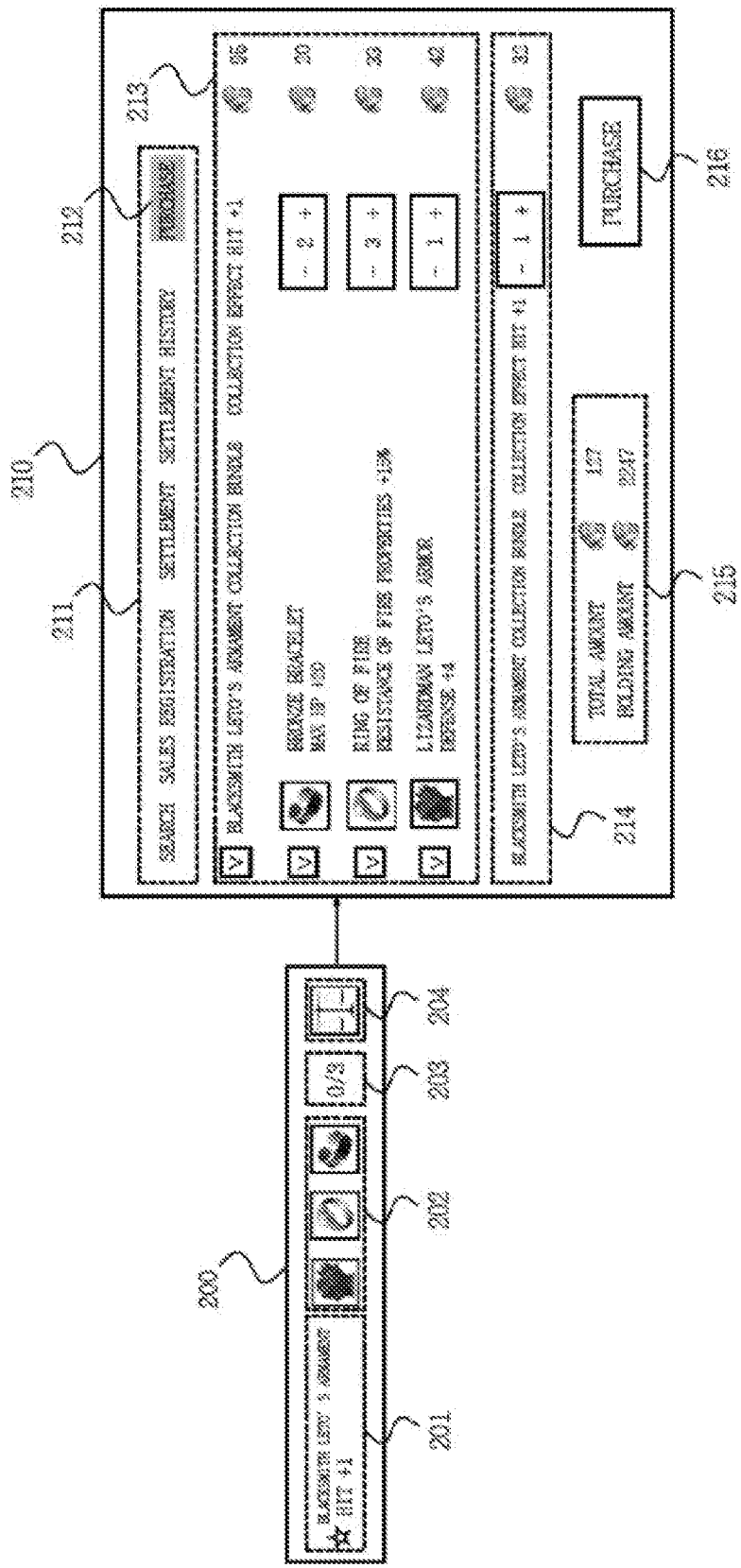

COLLECTION BUNDLE PURCHASE DEVICE AND COLLECTION BUNDLE PURCHASE METHOD

CROSS-REFERENCE TO RELATED APPLICATION

This application claims the benefit of Korean Patent Application No. 10-2021-0006827, filed on Jan. 18, 2021, in the Korean Intellectual Property Office, the disclosure of which is incorporated herein in its entirety by reference.

BACKGROUND

1. Field

One or more embodiments relate to a collection bundle purchase device and a collection bundle purchase method.

2. Description of the Related Art

An online game is a computer game that is implemented so that the computer game may operate on a wired or wireless network, and an online game player may play a game with another person in a remote place through a wired or wireless network.

A role-playing game is a computer game in which a game user assumes the role of a character appearing in a game program and performs the role directly. Role-playing game players travel through the world of adventure and imagination according to rules set by a game manager and perform various missions, so they may feel as if they are the main characters in the game.

In particular, Massively Multi-player Online Role Playing Games (MMORPG) that allow multiple users to simultaneously participate and perform various missions (quests) on a game map implemented in a virtual space are gaining popularity.

Items are things that game players' avatars acquire, which may be manipulated and require a storage space (inventory). In fantasy novels, the items are often used as an abbreviation for magic items. Strictly speaking, an item may be viewed as a trigger to access a specific program in the game.

SUMMARY

One or more embodiments include a collection bundle purchase device and a collection bundle purchase method capable of purchasing a collection as a bundle based on a user input.

One or more embodiments include a collection bundle purchase device and a collection bundle purchase method capable of purchasing each of at least two items constituting a collection as a bundle based on a user input.

One or more embodiments include a collection bundle purchase device and a collection bundle purchase method capable of selecting at least one of at least two items constituting a collection based on a user input.

One or more embodiments include a collection bundle purchase device and a collection bundle purchase method capable of changing a purchase quantity of at least one of at least two items constituting a collection based on a user input.

One or more embodiments include a collection bundle purchase device and a collection bundle purchase method capable of purchasing at least one of at least two items constituting a collection based on a user input by changing an enhancement value of the item.

Additional aspects will be set forth in part in the description which follows and, in part, will be apparent from the description, or may be learned by practice of the presented embodiments.

According to one or more embodiments, a collection bundle purchase device includes at least one processor, wherein the at least one processor displays a collection included in a collection menu based on a user input, and purchases the collection as a bundle based on the user input for the collection.

In addition, the at least one processor may display an exchange price and an item quantity of each of at least two items constituting the collection.

In addition, the at least one processor may select at least one of the at least two items constituting the collection based on the user input.

In addition, the at least one processor may change a purchase quantity of at least one of the at least two items constituting the collection based on the user input.

In addition, the at least one processor may change an enhancement value of at least one of the at least two items constituting the collection based on the user input.

In addition, the at least one processor may display a bundle price and a bundle purchase quantity of the collection.

In addition, the at least one processor may change the bundle purchase quantity of the collection based on the user input.

According to one or more embodiments, a collection bundle purchase method includes displaying a collection included in a collection menu based on a user input; and purchasing the collection as a bundle based on the user input for the collection.

In addition, the purchasing of the collection as a bundle may further include displaying an exchange price and an item quantity of each of at least two items constituting the collection.

In addition, the displaying of an exchange price and an item quantity of each of the at least two items constituting the collection may further include selecting at least one of the at least two items constituting the collection based on the user input.

In addition, the displaying of an exchange price and an item quantity of each of the at least two items constituting the collection may further include changing a purchase quantity of at least one of the at least two items constituting the collection based on the user input.

In addition, the displaying of an exchange price and an item quantity of each of the at least two items constituting the collection may further include changing an enhancement value of at least one of the at least two items constituting the collection based on the user input.

In addition, the purchasing of the collection as a bundle may further include displaying a bundle price and a bundle purchase quantity of the collection.

In addition, the displaying of a bundle price and a bundle purchase quantity of the collection may further include changing the bundle purchase quantity of the collection based on the user input.

BRIEF DESCRIPTION OF THE DRAWINGS

These and/or other aspects will become apparent and more readily appreciated from the following description of the embodiments, taken in conjunction with the accompanying drawings in which:

FIGS. 2A and 2B are views illustrating a state in which a collection is purchased as a bundle according to an embodiment;

DETAILED DESCRIPTION

Figure 1:
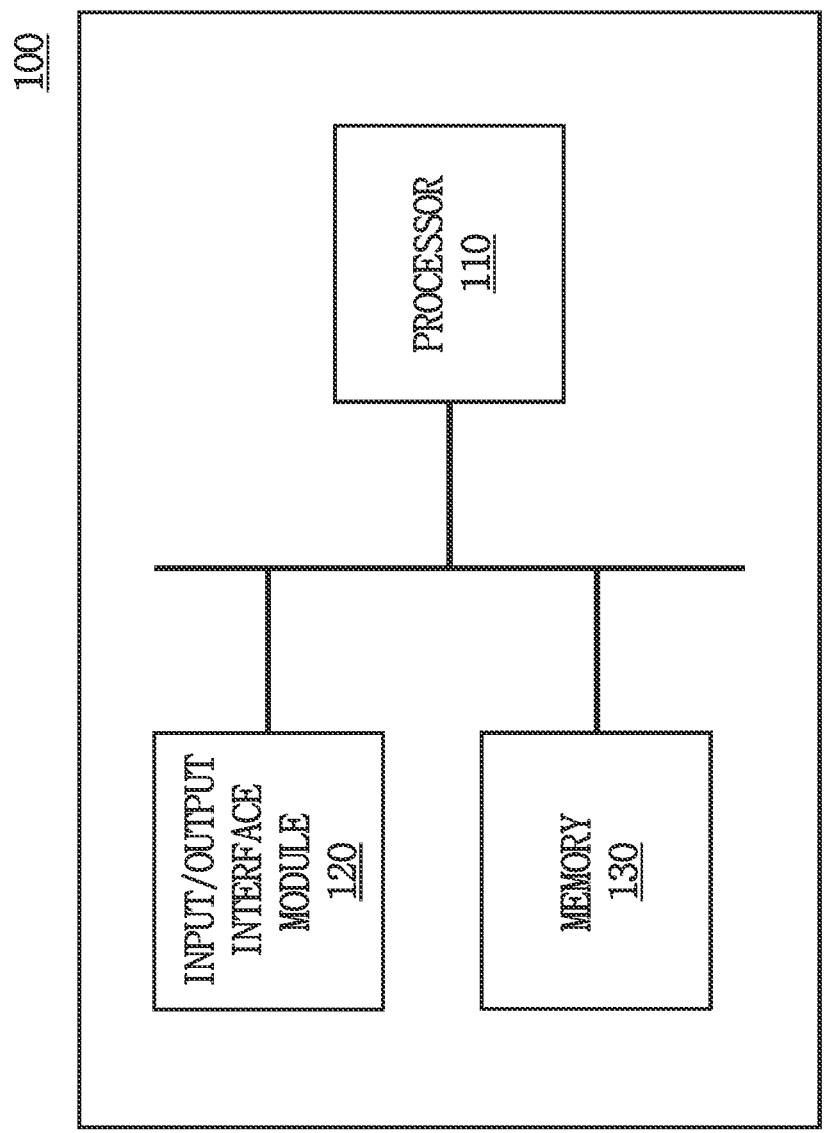
FIG. 1 is a view illustrating a configuration of a collection bundle purchase device according to an embodiment.

Specific structural or functional descriptions for embodiments according to the disclosure disclosed herein are merely illustrative for illustrating embodiments according to the disclosure. The embodiments according to the disclosure may be implemented in various forms and are not limited to the embodiments described herein.

The embodiments according to the disclosure may be variously modified and have various forms, so that the embodiments are illustrated in the drawings and described in detail herein. However, this does not limit the disclosure within specific embodiments and it should be understood that the disclosure covers all the modifications, equivalents, and replacements within the idea and technical scope of the disclosure.

It will be understood that, although the terms first, second, etc. may be used herein to describe various elements, these elements should not be limited by these terms. These terms are only used to distinguish one element from another. For example, as long as within the scope of the disclosure, a first element may be named as a second element, and a second element may be named as a first element.

Further, if it is described that one element is "connected" or "accesses" the other element, it is understood that the one element may be directly connected to or may directly access the other element but unless explicitly described to the contrary, another element may be "connected" or "access" between the elements. However, if it is described that one element is "directly connected" or "directly accesses" the other element, it is understood that there are no other elements exists between them. Other expressions that describe the relationship between elements, such as "between" and "directly between" or "adjacent to" and "directly adjacent to" should be understood as above.

The terms used in this application, only certain embodiments have been used to describe, is not intended to limit the disclosure. As used herein, the singular forms "a," "an," and "the" are intended to include the plural forms as well, unless the context clearly indicates otherwise.

It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, the same reference numerals denote the same components, and unnecessary redundant explanations and descriptions of known technologies will be omitted.

In the embodiment of the disclosure, 'communication', 'communication network' and 'network' may be used in the same sense. The three terms refer to wired and wireless local and wide area data communication networks capable of transmitting and receiving a file among a user terminal, terminals of other users, and a download server.

Hereinafter, preferred embodiments of the disclosure will be described in detail with reference to the accompanying drawings.

FIG. 1 is a view illustrating a configuration of a collection bundle purchase device according to an embodiment.

Referring to FIG. 1, a collection bundle purchase device 100 according to an embodiment includes a processor 110, an input/output interface module 120, and a memory 130.

The processor 110, the input/output interface module 120, and the memory 130 included in the collection bundle purchase device 100 are interconnected and may transmit data to each other.

According to an embodiment, the processor 110 may execute programs or commands stored in the memory 130. In this case, an operation program (e.g., OS) for operating the collection bundle purchase device 100 may be stored in the memory 130.

According to an embodiment, the processor 110 may execute a program for managing information about the collection bundle purchase device 100.

According to an embodiment, the processor 110 may execute a program for managing the operation of the collection bundle purchase device 100.

According to an embodiment, the processor 110 may execute a program for managing the operation of the input/output interface module 120.

i) Display Collection

According to an embodiment, the processor 110 may execute a game. In this case, the game may be a game executed inside the collection bundle purchase device 100. In addition, the game may be a game executed in an external device (e.g., a game server, etc.) of the collection bundle purchase device 100.

According to an embodiment, the processor 110 may obtain a user input generated in the game through the input/output interface module 120. At this time, the user input may be a touch on a specific collection name (e.g., Blacksmith Leto's Armament) from among a collection list existing in a collection menu of the game, but the user input is not limited thereto.

According to an embodiment, the processor 110 may display a collection included in the collection menu based on the user input obtained through the input/output interface module 120.

According to an embodiment, in relation to the collection, the processor 110 may display, through the input/output interface module 120, whether the collection is a favorite, the name of the collection, a collection effect of the collection, images of items constituting the collection, the degree of enhancement of each of the items constituting the collection, the number of items constituting the collection, the number of items possessed in the collection, and an object for purchasing the collection as a bundle, but what the processor 110 may display through the input/output interface module 120 is not limited thereto.

According to an embodiment, the processor 110 may display a specific collection included in the collection menu of the game based on a user input (e.g., touch a specific collection name) for a specific collection name from among a collection list existing in the collection menu of the game.

According to an embodiment, the processor 110 may display a collection in a pop-up form on a game play screen through the input/output interface module 120, but a method by which the processor 110 displays the collection is not limited thereto.

According to an embodiment, the processor 110 may display information related to a collection through the input/output interface module 120 based on a preset order. In this case, the preset order may be changed based on a user input.

According to an embodiment, the processor 110 may display, through the input/output interface module 120, information related to a collection in the order of whether the collection is a favorite, the name of the collection, a collection effect of the collection, images of items corresponding to the number of items constituting the collection, the degree of enhancement of each of the items constituting the collection, the number of items possessed in the collection, and an object for purchasing the collection as a bundle, but the order in which the processor 110 displays information related to the collection through the input/output interface module 120 is not limited thereto.

i) Purchase Collection as Bundle

According to an embodiment, the processor 110 may purchase a collection as a bundle based on the user input to the collection.

According to an embodiment, the processor 110 may obtain a user input for an object for purchasing the collection as a bundle (e.g., an exchange button tab) included in the collection through the input/output interface module 120. In this case, the user input may be a touch on the object for purchasing the collection as a bundle (e.g., an exchange button tab), but the user input is not limited thereto.

According to an embodiment, the processor 110 may display, through the interface module 120, a predefined place in a game where the collection may be purchased as a bundle (e.g., an in-game exchange) in response to the obtained user input. In this case, the predefined place in the game where the collection may be purchased as a bundle (e.g., an in-game exchange) may include a plurality of tabs (e.g., a search tab, a sales registration tab, a settlement tab, a settlement history tab, a purchase tab, etc.).

According to an embodiment, the processor 110 may purchase the collection as a bundle based on a user input for a specific tab (e.g., a purchase tab) of the predefined place in the game where the collection may be purchased as a bundle (e.g., an in-game exchange) displayed above.

According to an embodiment, the processor 110 may display an exchange price and an item quantity of each of at least two items constituting the collection on a specific tab (e.g., a purchase tab) of the predefined place in the game where the collection may be purchased as a bundle (e.g., an in-game exchange) displayed above.

According to an embodiment, the processor 110 may generate an interface for selecting at least one of the at least two items constituting the collection on a specific tab (e.g., a purchase tab) of the predefined place in the game where the collection may be purchased as a bundle (e.g., an in-game exchange) displayed above.

According to an embodiment, the processor 110 may select at least one of the at least two items constituting the collection based on a user input to the interface.

According to an embodiment, the processor 110 may display that the item is selected as a preset image on the interface (e.g., mark v in a rectangle) for the item selected based on the user input from among the at least two items constituting the collection.

According to an embodiment, the processor 110 may generate an interface for deselecting at least one of the at least two items constituting the collection on a specific tab (e.g., a purchase tab) of the predefined place in the game where the collection may be purchased as a bundle (e.g., an in-game exchange) displayed above.

According to an embodiment, the processor 110 may deselect at least one of the at least two items constituting the collection based on a user input to the interface.

According to an embodiment, the processor 110 may display that the item is deselected as a preset image (e.g., mark v in a rectangle) for the item selected based on the user input from among the at least two items constituting the collection.

According to an embodiment, the processor 110 may display at least one of an image of each of the items constituting the collection on a specific tab (e.g., a purchase tab) of the predefined place in the game where the collection may be purchased as a bundle (e.g., an in-game exchange) displayed above, the name of each of the items constituting the collection, the degree of enhancement of each of the items constituting the collection (e.g., +3, etc.), and an effect of each of the items constituting the collection (e.g., max HP+20, etc.).

According to an embodiment, the processor 110 may generate an interface capable of changing an enhancement value of at least one item selected based on a user input (e.g., changing the enhancement value of the item from +2 to 0) in a specific tab (e.g., a purchase tab) of the predefined place in the game where the collection may be purchased as a bundle (e.g., an in-game exchange) displayed above. In this case, enhancement probability information according to the enhancement value (e.g., high, medium, low, very low, etc.) may be displayed on the interface, but information that may be displayed on the interface is not limited thereto.

According to an embodiment, the processor 110 may change an enhancement value of at least one item selected based on a user input from among the at least two items constituting the collection, based on a user input to the interface.

According to an embodiment, the processor 110 may display an enhancement value of at least one item changed based on a user input from among the at least two items constituting the collection.

According to an embodiment, the processor 110 may display the enhancement value of the at least one item changed based on a user input from among the at least two items constituting the collection in the degree of enhancement of each of the items constituting the collection (e.g., +2→0).

According to an embodiment, the processor 110 may modify an exchange price of at least one item changed based on a user input from among the at least two items constituting the collection to an exchange price of an item matching the changed enhancement value.

According to an embodiment, the processor 110 may generate an interface capable of changing a bundle purchase quantity of at least one item selected based on a user input from among the at least two items constituting the collection in a specific tab (e.g., a purchase tab) of the predefined place in the game where the collection may be purchased as a bundle (e.g., an in-game exchange) displayed above.

According to an embodiment, the processor 110 may change the bundle purchase quantity of the at least one item selected based on a user input from among the at least two items constituting the collection, based on the user input to the interface.

According to an embodiment, the processor 110 may display the bundle purchase quantity of the at least one item changed based on a user input from among the at least two items constituting the collection.

According to an embodiment, the processor 110 may display a bundle price and a bundle purchase quantity of the collection on a specific tab (e.g., a purchase tab) of the predefined place in the game where the collection may be purchased as a bundle (e.g., an in-game exchange) displayed above.

According to an embodiment, the processor 110 may generate an interface capable of changing the bundle purchase quantity of the collection in a specific tab (e.g., a purchase tab) of the predefined place in the game where the collection may be purchased as a bundle (e.g., an in-game exchange) displayed above.

According to an embodiment, the processor 110 may change the bundle purchase quantity of the collection based on the user input to the interface.

According to an embodiment, the input/output interface module 120 may be communicatively connected to an external device (e.g., a game server, etc.) through a network.

According to an embodiment, the input/output interface module 120 may transmit data to an external device (e.g., a game server, etc.) through a network.

According to an embodiment, the input/output interface module 120 may receive data transmitted from an external device (e.g., a game server, etc.) through a network.

According to an embodiment, the input/output interface module 120 may display a game play screen.

According to an embodiment, the input/output interface module 120 may display an interface generated by the processor 110.

According to an embodiment, the input/output interface module 120 may display an image displayed by the processor 110.

According to an embodiment, the input/output interface module 120 may obtain a user input.

According to an embodiment, the input/output interface module 120 may display collection information.

According to an embodiment, the input/output interface module 120 may be provided integrally with the collection bundle purchase device 100.

According to an embodiment, the input/output interface module 120 may be provided separately from the collection bundle purchase device 100.

According to an embodiment, the input/output interface module 120 may be a separate device communicatively connected to the collection bundle purchase device 100.

According to an embodiment, the input/output interface module 120 may include a port (e.g., a USB port) for connecting to an external device.

According to an embodiment, the input/output interface module 120 may include a monitor, a touch screen, a mouse, an electronic pen, a microphone, a keyboard, a speaker, an earphone, a headphone, or a touch pad.

According to an embodiment, the memory 130 may store data received by the input/output interface module 120.

According to an embodiment, the memory 130 may store a user input obtained by the input/output interface module 120.

According to an embodiment, the memory 130 may store data transmitted by the input/output interface module 120.

According to an embodiment, the memory 130 may store a user's action obtained by the input/output interface module 120.

According to an embodiment, the memory 130 may store the interface generated by the processor 110.

As used herein, it is apparent to those of ordinary skill in the art that the term 'module' refers to a logical structural unit and is not necessarily a physically separate component.

FIGS. 2A and 2B are views illustrating a state in which a collection is purchased as a bundle according to an embodiment.

FIG. 2A is a view illustrating a state of displaying a collection, and FIG. 2B is a view illustrating a state in which the collection is purchased as a bundle.

Referring to FIG. 2A, according to an embodiment, a collection bundle purchase device may display a game being played.

According to an embodiment, the collection bundle purchase device may obtain a user input generated in the game. At this time, the user input may be a touch on a specific collection name (e.g., Blacksmith Leto's Armament) from among a collection list existing in a collection menu of the game, but the user input is not limited thereto.

According to an embodiment, the collection bundle purchase device may display a collection 200 included in the collection menu based on the obtained user input.

According to an embodiment, in relation to the collection 200, the collection bundle purchase device may display whether the collection is a favorite, the name of the collection, a collection effect 201 of the collection, images 202 of items constituting the collection, the number 203 of items possessed in the collection, and an object 204 for purchasing the collection as a bundle, but what the collection bundle purchase device may display is not limited thereto.

According to an embodiment, the collection bundle purchase device may display the collection 200 in a pop-up form on a game play screen, but a method by which the collection bundle purchase device displays the collection 200 is not limited thereto.

According to an embodiment, the collection bundle purchase device may display information related to the collection 200 based on a preset order (201, 202, 203, and 204). In this case, the preset order may be changed based on a user input.

According to an embodiment, the collection bundle purchase device may obtain a user input for the object 204 for purchasing a displayed collection as a bundle in relation to the collection 200. In this case, the user input may be a touch on the object 204 for purchasing a collection as a bundle, but the user input is not limited thereto.

According to an embodiment, the collection bundle purchase device may display an exchange 210 existing in the game based on the user input to the object 204 for purchasing a collection as a bundle.

Referring to FIG. 2B, a search tab, a sales registration tab, a settlement tab, a settlement history tab, and a purchase tab may be displayed (211) on the exchange 210 existing in the game.

According to an embodiment, the exchange 210 existing in the game may be displayed with a purchase tab 212 activated.

According to an embodiment, the collection bundle purchase device may activate the purchase tab 212 based on a user input.

According to an embodiment, in the activated purchase tab 212, in order to purchase items constituting a collection as a bundle, the name of the collection, a collection effect of the collection, the total price of items selected to purchase from among the items constituting the collection, whether the items constituting the collection are selected, an image of an item, the name of the item, an effect of the item, a purchase quantity, and a purchase price per item may be displayed (213).

According to an embodiment, the collection bundle purchase device may display an interface for selecting at least one from among the items constituting the collection on the purchase tab 212.

According to an embodiment, the collection bundle purchase device may display an interface for changing a bundle purchase quantity of the items selected to purchase from among the items constituting the collection on the purchase tab 212.

According to an embodiment, a bundle purchase quantity and a bundle purchase price of the collection may be displayed (214) on the purchase tab 212 activated by the collection bundle purchase device.

According to an embodiment, in the purchase tab 212 activated by the collection bundle purchase device, a sum of the total price of the items selected to purchase from among the items constituting the collection and the bundle purchase price of the collection, and the amount currently held by a user may be displayed (215).

According to an embodiment, in the purchase tab 212 activated by the collection bundle purchase device, an image (e.g., a purchase button) 216 for purchasing the items selected to purchase from among the items constituting the collection and a collection to be purchased as a bundle may be displayed.

Figures 3A, 3B:
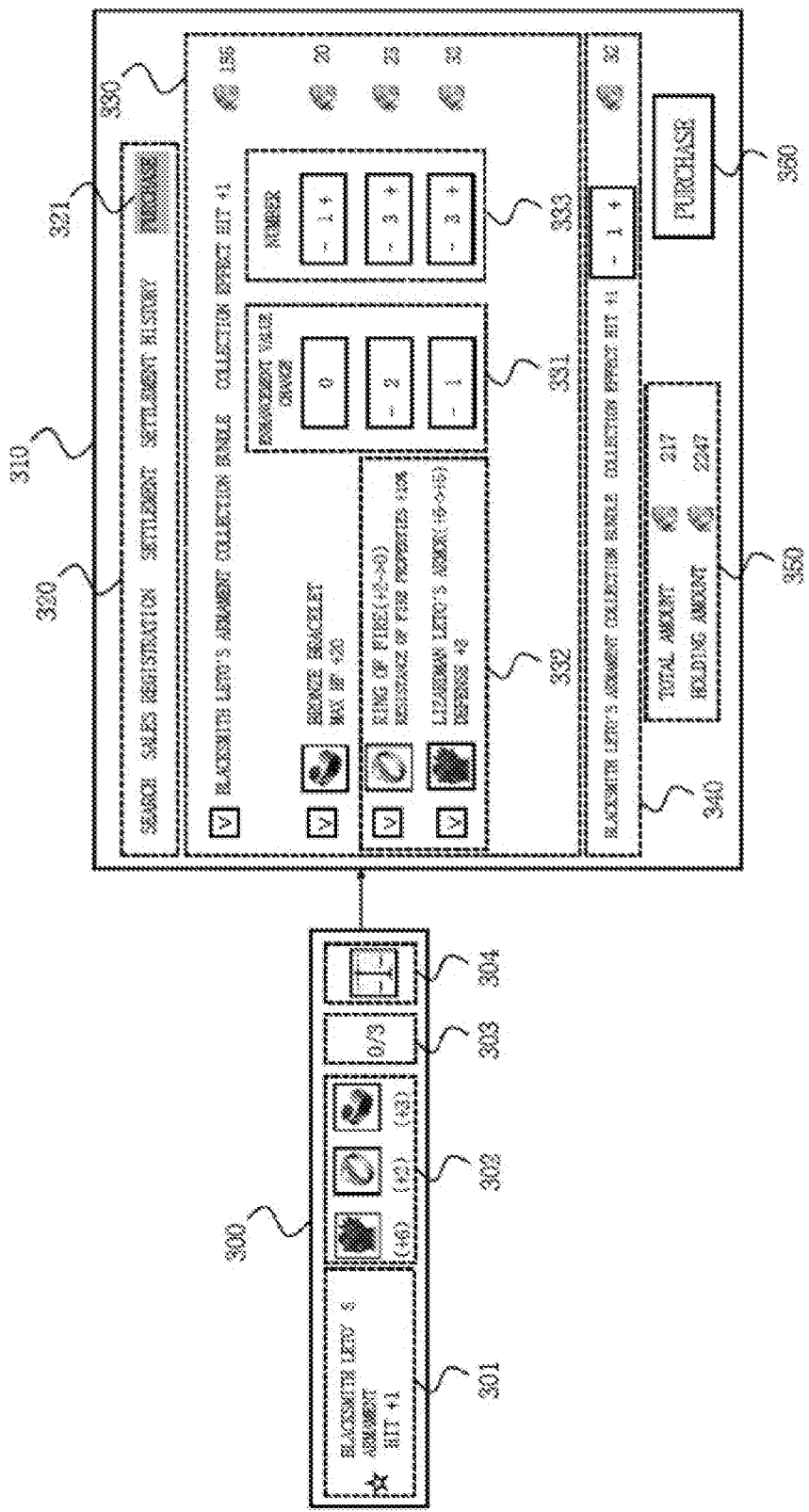
FIGS. 3A and 3B are views illustrating a state in which a collection is purchased as a bundle according to another embodiment.

FIGS. 3A and 3B are views illustrating a state in which a collection is purchased as a bundle according to another embodiment.

FIG. 3A is a view illustrating a state of displaying a collection, and FIG. 3B is a view illustrating a state in which the collection is purchased as a bundle.

Referring to FIG. 3A, according to an embodiment, a collection bundle purchase device may display a game being played.

According to an embodiment, the collection bundle purchase device may obtain a user input generated in the game. At this time, the user input may be a touch on a specific collection name (e.g., Blacksmith Leto's Armament) from among a collection list existing in a collection menu of the game, but the user input is not limited thereto.

According to an embodiment, the collection bundle purchase device may display a collection 300 included in the collection menu based on the obtained user input.

According to an embodiment, in relation to the collection 300, the collection bundle purchase device may display whether the collection is a favorite, the name of the collection, a collection effect 301 of the collection, images of items constituting the collection, the degree of enhancement 302 of each of the items constituting the collection (e.g., +6, +2, +3, etc.), the number 303 of items possessed in the collection, and an object 304 for purchasing the collection as a bundle, but what the collection bundle purchase device may display is not limited thereto.

According to an embodiment, the collection bundle purchase device may display the collection 300 in a pop-up form on a game play screen, but a method by which the collection bundle purchase device displays the collection 300 is not limited thereto.

According to an embodiment, the collection bundle purchase device may display information related to the collection 300 based on a preset order (301, 302, 303, and 304). In this case, the preset order may be changed based on a user input.

According to an embodiment, the collection bundle purchase device may obtain a user input for the object 304 for purchasing a displayed collection as a bundle in relation to the collection 300. In this case, the user input may be a touch on the object 304 for purchasing a collection as a bundle, but the user input is not limited thereto.

According to an embodiment, the collection bundle purchase device may display an exchange 310 existing in the game based on the user input to the object 304 for purchasing a collection as a bundle.

Referring to FIG. 3B, a search tab, a sales registration tab, a settlement tab, a settlement history tab, and a purchase tab may be displayed (320) on the exchange 310 existing in the game.

According to an embodiment, the exchange 310 existing in the game may be displayed with a purchase tab 321 activated.

According to an embodiment, the collection bundle purchase device may activate the purchase tab 321 based on a user input.

According to an embodiment, in the activated purchase tab 312, in order to purchase items constituting a collection as a bundle, the name of the collection, a collection effect of the collection, the total price of items selected to purchase from among the items constituting the collection, whether the items constituting the collection are selected, an image of an item, the name of the item, the degree of enhancement of the item (e.g., +3, etc.), an effect of the item (e.g., max HP +20), a changed enhancement value (e.g., −2, +1, etc.), a purchase quantity, and a purchase price per item may be displayed (330).

According to an embodiment, the collection bundle purchase device may display an interface for selecting at least one from among the items constituting the collection on the purchase tab 321.

According to an embodiment, the collection bundle purchase device may display an interface 331 for changing an enhancement value of the at least one from among the items constituting the collection on the purchase tab 321 based on a user input. In this case, enhancement probability information according to the enhancement value may be displayed on the interface 331, but information that may be displayed on the interface 331 is not limited thereto.

According to an embodiment, the collection bundle purchase device may change (332) the degree of enhancement of the item (e.g., +2, etc.) displayed on the activated purchase tab 321 based on a user input to the interface 331 for changing the enhancement value of the at least one from among the items constituting the collection (e.g., +2→0, +6→+5, etc.).

According to an embodiment, the collection bundle purchase device may modify an exchange price of at least one item changed based on a user input from among the at least two items constituting the collection to an exchange price of an item matching a changed enhancement value.

According to an embodiment, the collection bundle purchase device may display the modified exchange price of the item on the purchase tab 321.

According to an embodiment, the collection bundle purchase device may display an interface 333 for changing a bundle purchase quantity of the items selected to purchase from among the items constituting the collection on the purchase tab 321.

According to an embodiment, a bundle purchase quantity and a bundle purchase price of the collection may be displayed (340) on the purchase tab 321 activated by the collection bundle purchase device.

According to an embodiment, in the purchase tab 321 activated by the collection bundle purchase device, a sum of the total price of the items selected to purchase from among the items constituting the collection and the bundle purchase price of the collection, and the amount currently held by the user may be displayed (350).

According to an embodiment, in the purchase tab 321 activated by the collection bundle purchase device, an image (e.g., a purchase button) 360 for purchasing the items selected to purchase from among the items constituting the collection and a collection to be purchased as a bundle may be displayed.

Figure 4:
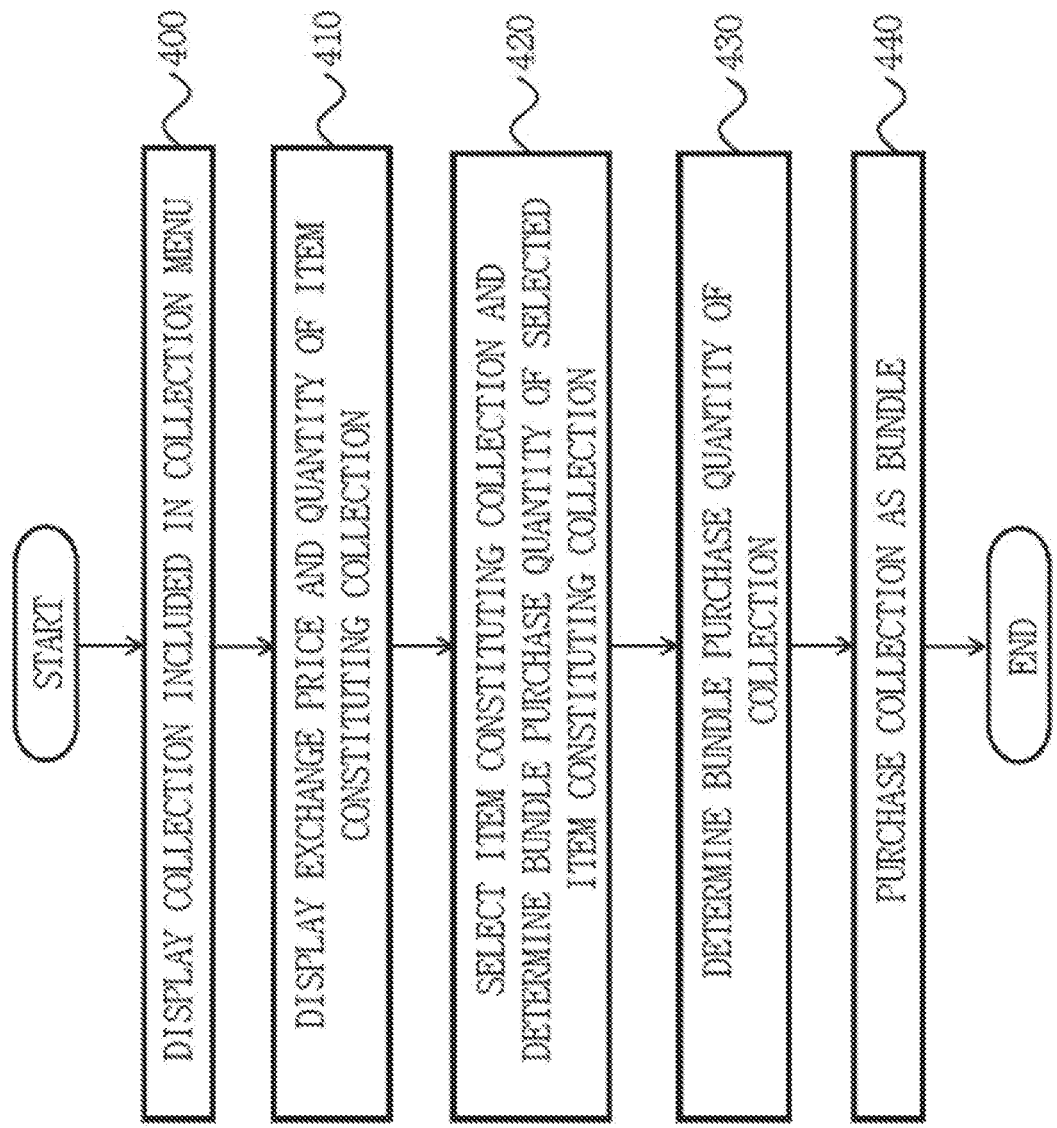
FIG. 4 is a flowchart illustrating a collection bundle purchase method according to an embodiment.

FIG. 4 is a flowchart illustrating a collection bundle purchase method according to an embodiment.

Referring to FIG. 4, in operation 400, the collection bundle purchase device according to an embodiment displays a collection included in a collection menu based on a user input.

At this time, in relation to the collection, the collection bundle purchase device may display whether the collection is a favorite, the name of the collection, a collection effect of the collection, images of items constituting the collection, the number of items constituting the collection, the number of items possessed in the collection, and an object for purchasing the collection as a bundle, but what the collection bundle purchase device may display is not limited thereto.

In addition, the collection bundle purchase device may display the collection in a pop-up form on a game play screen, but a method by which the collection bundle purchase device displays the collection is not limited thereto.

In operation 410, the collection bundle purchase device displays an exchange price and an item quantity of each of at least two items constituting the collection.

In this case, in the collection bundle purchase device, in order to purchase items constituting the collection as a bundle, the name of the collection, a collection effect of the collection, whether the items constituting the collection are selected, an image of an item, the name of the item, an effect of the item (e.g., max HP+20), a purchase quantity, and a purchase price per item may be displayed.

In addition, the collection bundle purchase device may display a bundle price and a bundle purchase quantity of the collection.

In operation 420, the collection bundle purchase device selects at least one of the at least two items constituting the collection based on the user input, and determines a bundle purchase quantity of the selected at least one of the at least two items constituting the collection.

In this case, the collection bundle purchase device may display an interface for selecting at least one of the at least two items constituting the collection.

In addition, the collection bundle purchase device may display an interface capable of changing the bundle purchase quantity of the selected at least one of the at least two items constituting the collection.

In addition, the collection bundle purchase device may display a bundle purchase price of the selected at least one of the at least two items constituting the collection for each item.

In addition, the collection bundle purchase device may display a total purchase price of a bundle of the selected at least one of the at least two items constituting the collection.

In operation 430, the collection bundle purchase device determines the bundle purchase quantity of the collection based on the user input.

In this case, the collection bundle purchase device may display an interface capable of changing the bundle purchase quantity of the collection.

In addition, the collection bundle purchase device may display a price for purchasing the collection as a bundle.

In operation 440, the collection bundle purchase device purchases the bundle of the selected at least one of the at least two items constituting the collection or the collection as a bundle.

At this time, the above collection bundle purchase device may display the total amount held by the user and provide the user with information about whether the bundle of the selected at least one of the at least two items constituting the collection or the bundle of the collection can be purchased.

Although operation 420 is exemplified in FIG. 4 as being performed before operation 430, operation 420 and operation 430 may be performed simultaneously, in parallel, or overlapping, or operation 420 may be performed after operation 430.

Figure 5:
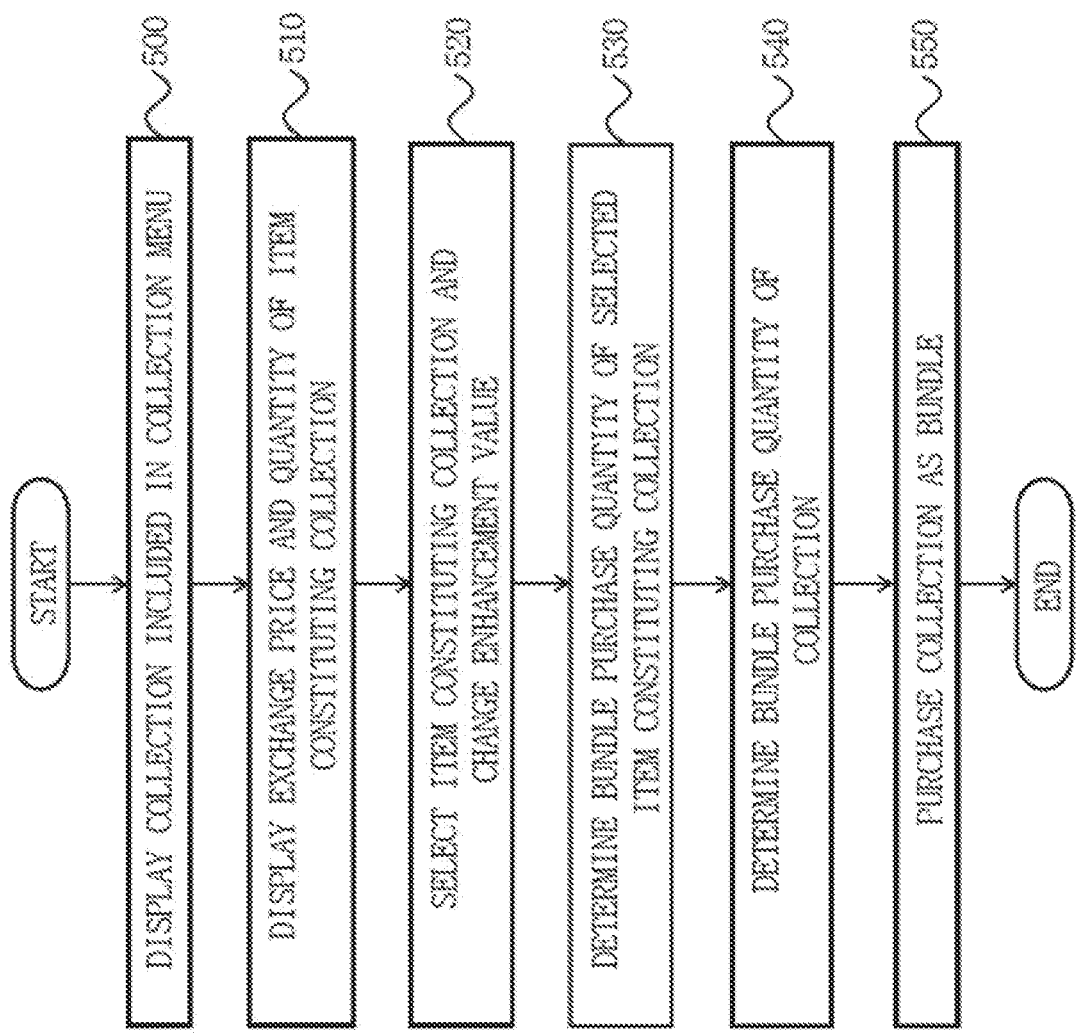
FIG. 5 is a flowchart illustrating a collection bundle purchase method according to another embodiment.

FIG. 5 is a flowchart illustrating a collection bundle purchase method according to another embodiment.

Referring to FIG. 5, in operation 500, the collection bundle purchase device according to an embodiment displays a collection included in a collection menu based on a user input.

At this time, in relation to the collection, the collection bundle purchase device may display whether the collection is a favorite, the name of the collection, a collection effect of the collection, images of items constituting the collection, the number of items constituting the collection, the degree of enhancement of each of the items constituting the collection (e.g., +6, +2, +3, etc.), the number of items possessed in the collection, and an object for purchasing the collection as a bundle, but what the collection bundle purchase device may display is not limited thereto.

In addition, the collection bundle purchase device may display the collection in a pop-up form on a game play screen, but a method by which the collection bundle purchase device displays the collection is not limited thereto.

In operation 510, the collection bundle purchase device displays an exchange price and an item quantity of each of at least two items constituting the collection.

In this case, in the collection bundle purchase device, in order to purchase items constituting the collection as a bundle, the name of the collection, a collection effect of the collection, whether the items constituting the collection are selected, an image of an item, the name of the item, the degree of enhancement of the item, an effect of the item (e.g., max HP+20), a changed enhancement value, a purchase quantity, and a purchase price per item may be displayed.

In addition, the collection bundle purchase device may display a bundle price and a bundle purchase quantity of the collection.

In operation 520, the collection bundle purchase device selects at least one of the at least two items constituting the collection based on the user input, and changes an enhancement value of the selected at least one of the at least two items constituting the collection.

In this case, the collection bundle purchase device may display an interface for selecting at least one of the at least two items constituting the collection.

In addition, the collection bundle purchase device may display an interface for changing an enhancement value of at least one of items constituting a collection based on a user input.

In addition, the collection bundle purchase device may change the degree of enhancement of the displayed item (e.g., +3, etc.) based on a user input to the interface for changing the enhancement value of the at least one of the items constituting the collection (e.g., +2→0, +6→+5, etc.). In this case, enhancement probability information according to the enhancement value (e.g., high, medium, low, very low, etc.) may be displayed on the interface, but information that may be displayed on the interface is not limited thereto.

In addition, the collection bundle purchase device may modify an exchange price of at least one item changed based on a user input from among the at least two items constituting the collection to an exchange price of an item matching a changed enhancement value.

In addition, the collection bundle purchase device may display the modified exchange price of the item.

In operation 530, the collection bundle purchase device determines a bundle purchase quantity of at least one of the at least two items constituting the collection.

In this case, the collection bundle purchase device may display an interface capable of changing a bundle purchase quantity of the selected at least one of the at least two items constituting the collection.

In addition, the collection bundle purchase device may display a bundle purchase price of the selected at least one of the at least two items constituting the collection for each item.

In addition, the collection bundle purchase device may display a total purchase price of a bundle of the selected at least one of the at least two items constituting the collection.

In operation 540, the collection bundle purchase device determines the bundle purchase quantity of the collection based on the user input.

In this case, the collection bundle purchase device may display an interface capable of changing the bundle purchase quantity of the collection.

In addition, the collection bundle purchase device may display a price for purchasing the collection as a bundle.

In operation 550, the collection bundle purchase device purchases the bundle of the selected at least one of the at least two items constituting the collection or the collection as a bundle.

At this time, the collection bundle purchase device may display a total holding amount of the user and provide the user with information about whether the bundle of the selected at least one of the at least two items constituting the collection or the bundle of the collection can be purchased.

Although operations 520 and 530 are exemplified in FIG. 5 as being performed before operation 540, operations 520 and 530 and operation 540 may be performed simultaneously, in parallel, or overlapping, or operations 520 and 530 may be performed after operation 540.

According to an embodiment of the disclosure, a collection may be purchased as a bundle based on a user input.

In addition, there is an effect that each of at least two items constituting a collection may be purchased as a bundle based on a user input.

In addition, there is an effect that at least one of at least two items constituting a collection may be selected based on a user input.

In addition, there is an effect that a purchase quantity of at least one of at least two items constituting a collection may be changed based on a user input.

In addition, there is an effect that a purchase may be made by changing an enhancement value of at least one of at least two items constituting a collection based on a user input.

Hereinabove, all components according to the embodiments are described to be combined as one or are described to operate by being combined with each other, but the disclosure is not limited thereto. In other words, at least two of the components may selectively combine to operate within the scopes of the disclosure.

In addition, each of the components may be realized as independent hardware, or some or all of the components may be selectively combined to be realized as a computer program having a program module in which some or all functions are performed in one or more hardware. Code and code segments for configuring the computer program may be easily construed by one of ordinary skill in the art to which embodiments belong.

Such a computer program may be stored in a computer readable medium, and read and executed by a computer, thereby implementing the embodiment. Examples of the computer readable medium of the computer program may be a magnetic recording medium, an optical recording medium, or the like.

Furthermore, when a part "includes", "comprises", or "has" an element, unless there is a particular description contrary thereto, the part may further include other elements, not excluding the other elements.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The methods disclosed in the disclosure include one or more operations or actions for achieving the methods. The operations and/or actions for achieving the methods may be interchanged with one another without departing from the scope of the claims. In other words, the order and/or use of specific operations and/or actions may be modified without departing from the scope of the claims, unless a certain order for the operations and/or actions is specified.

As used herein, a phrase referring to "at least one of" a list of items refers to any combination of these items, including single members. As an example, "at least one of a, b, or c:" is intended to include any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c), as well as a, b, c, a-b, a-c, b-c, and a-b-c.

As used herein, the term "determining" encompasses a wide variety of actions. For example, the term "determining" may include computing, processing, deriving, examining, looking up (e.g., looking up in a table, database, or other data structure), identifying, and the like. The term "determining" may also include receiving (e.g., receiving information), accessing (accessing data in a memory), and the like. The term "determining" may also include resolving, selecting, choosing, establishing, and the like.

The description herein is for describing the disclosure and numerous modifications and adaptations will be readily apparent to one of ordinary skill in the art without departing from the spirit and scope of the disclosure.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A collection bundle purchase device for displaying and rearranging a plurality of icons in a collection menu, the collection bundle purchase device comprising:
at least one processor,
wherein the at least one processor is configured to:
receive a first user input on the collection menu, a second user input on the collection menu, a third user input on a purchase menu, and a fourth user input on the collection menu:
display the collection menu on an application execution screen, the collection menu comprising a first set of the plurality of icons respectively corresponding to:
at least two items constituting a collection, and
information on a number of total number of the at least two items constituting the collection, and
a number of an item, included in the at least two items, that is currently possessed by a user;
determine, based on the first user input on the collection menu, a second set of the plurality of icons corresponding to a purchase of the collection, and displaying the second set of plurality of icons respectively corresponding to, in a first region of the collection menu, a bundle purchase price and a bundle purchase quantity of the collection, and, in a second region of the collection menu, an exchange price and an item quantity of each of the at least two items constituting the collection;
determine, based on the second user input in the second region, a purchase quantity of at least one of the at least two items constituting the collection and display a third set of the plurality of icons indicating the determined purchase quantity in the second region of the collection menu,
wherein the third set of the plurality of icons further indicate a sum of (i) the bundle purchase price of the collection and (ii) a total price of items selected to purchase according to the changed purchase quantity from among the at least two items constituting the collection; and
based on the third user input on the purchase menu, display a fourth set of the plurality of icons to purchase the collection as a bundle,
wherein the at least one processor is further configured to:
display the collection menu as a pop-up form on a game play screen, and
based on the fourth user input on the collection menu, rearrange a fifth set of the plurality of icons corresponding to a preset order of the bundle purchase price, the exchange price, and the item quantity of each of the at least two items constituting the collection.

2. The collection bundle purchase device of claim 1, wherein the at least one processor is further configured to select at least one of the at least two items constituting the collection, based on the second user input in the second region.

3. The collection bundle purchase device of claim 1, wherein the at least one processor is further configured to change an enhancement value of at least one of the at least two items constituting the collection, based on the second user input in the second region.

4. The collection bundle purchase device of claim 1, wherein the at least one processor is further configured to change the bundle purchase quantity of the collection, based on the first user input in the first region.

5. A collection bundle purchase method for displaying and rearranging a plurality of icons in a collection menu, the collection bundle purchase method comprising:
receiving a first user input on the collection menu, a second user input on the collection menu, a third user input on a purchase menu, and a fourth user input on the collection menu;
displaying the collection menu on an application execution screen, the collection menu comprising a first set of the plurality of icons respectively corresponding to:
at least two items constituting a collection,
information on a number of total number of the at least two items constituting the collection, and
a number of an item, included in the at least two items, that is currently possessed by a user;
determining, based on the first user input on the collection menu, a second set of the plurality of icons corresponding to a purchase of the collection, and displaying the second set of the plurality of icons, respectively corresponding to, in a first region of the collection menu, a bundle purchase price and a bundle purchase quantity of the collection, and, in a second region of the collection menu, an exchange price and an item quantity of each of the at least two items constituting the collection;
determining, based on the second user input in the second region of the collection menu, a purchase quantity of at least one of the at least two items constituting the collection and displaying a third set of the plurality of icons indicating the determined purchase quantity in the second region of the collection menu,
wherein the third set of the plurality of icons further indicate a sum of (i) the bundle purchase price of the collection and (ii) a total price of items selected to purchase according to the changed purchase quantity from among the at least two items constituting the collection; and
based on the third user input on the purchase menu, displaying a fourth set of the plurality of icons to purchase the collection as a bundle,
displaying the collection menu as a pop-up form on a game play screen, and
based on the fourth user input on the collection menu, rearranging a fifth set of the plurality of icons corresponding to a preset order of the bundle purchase price, the exchange price, and the item quantity of each of the at least two items constituting the collection.

6. The collection bundle purchase method of claim 5, further comprising:
selecting at least one of the at least two items constituting the collection, based on the second user input in the second region.

7. The collection bundle purchase method of claim 5, further comprising:

changing an enhancement value of at least one of the at least two items constituting the collection, based on the second user input in the second region.

8. The collection bundle purchase method of claim 5, further comprising:

changing the bundle purchase quantity of the collection, based on the first user input in the first region.

9. A non-transitory computer-readable recording medium having recorded thereon a program for executing a method of claim 8.

* * * * *